United States Patent
Koduru et al.

(10) Patent No.: US 9,293,820 B2
(45) Date of Patent: Mar. 22, 2016

(54) COMPENSATING FOR A NON-IDEAL SURFACE OF A REFLECTOR IN A SATELLITE COMMUNICATION SYSTEM

(71) Applicant: The Boeing Company, Seal Beach, CA (US)

(72) Inventors: Chandra S. Koduru, Hawthorne, CA (US); Kihyun Kevin Suh, Harbor City, CA (US); Murat E. Veysoglu, Cypress, CA (US); Greg Busche, Rolling Hills, CA (US)

(73) Assignee: The Boeing Company, Chicago, IL (US)

( * ) Notice: Subject to any disclaimer, the term of this patent is extended or adjusted under 35 U.S.C. 154(b) by 454 days.

(21) Appl. No.: 13/798,342

(22) Filed: Mar. 13, 2013

(65) Prior Publication Data

US 2014/0266870 A1    Sep. 18, 2014

(51) Int. Cl.
H04B 7/185     (2006.01)
H01Q 3/40      (2006.01)
H01Q 1/28      (2006.01)
H01Q 15/14     (2006.01)
H01Q 3/26      (2006.01)
H01Q 5/50      (2015.01)

(52) U.S. Cl.
CPC ............. *H01Q 3/40* (2013.01); *H01Q 1/288* (2013.01); *H01Q 3/2605* (2013.01); *H01Q 3/2658* (2013.01); *H01Q 5/50* (2015.01); *H01Q 15/14* (2013.01); *H01Q 15/148* (2013.01)

(58) Field of Classification Search
CPC ... H04B 7/185; H01Q 3/2658; H01Q 3/2605; H01Q 15/148; H01Q 5/50

USPC .......................................................... 342/354
See application file for complete search history.

(56) References Cited

U.S. PATENT DOCUMENTS

| | | | |
|---|---|---|---|
| 5,530,449 | A | 6/1996 | Wachs et al. |
| 5,784,030 | A | 7/1998 | Lane et al. |
| 5,903,549 | A | 5/1999 | von der Embse et al. |
| 6,055,431 | A * | 4/2000 | Dybdal .............. H04B 7/18515 455/13.4 |
| 6,799,014 | B2 | 9/2004 | Rosen et al. |
| 6,823,170 | B1 | 11/2004 | Dent |
| 6,866,231 | B2 | 3/2005 | Higgins |
| 6,993,288 | B2 | 1/2006 | de La Chapelle et al. |
| 7,110,716 | B2 | 9/2006 | Rao et al. |
| 7,376,417 | B2 | 5/2008 | Walsh et al. |
| 2003/0043068 | A1 | 3/2003 | Gayrard et al. |

(Continued)

OTHER PUBLICATIONS

He, et al., "In-Orbit Test Method of Shaped-Reflector Antenna on Satellites," China Electronic Equipment System Engineering Company, Beijing, China, 2009, 4 pages.

(Continued)

*Primary Examiner* — Harry Liu
(74) *Attorney, Agent, or Firm* — Womble Carlyle Sandridge & Rice LLP

(57) ABSTRACT

A method is provided that includes measuring amplitudes and phases of signals reflected off a reflector of a satellite, with the amplitudes and phases forming a first set of measurements. The method includes calculating an element correlation matrix as a function of the first set of measurements. The element correlation matrix represents a radiated feed element pattern off the reflector. And the method includes adjusting a formed beam pattern of a beamformer based on the element correlation matrix to thereby compensate for a non-ideal surface of the reflector.

20 Claims, 5 Drawing Sheets

(56) References Cited

U.S. PATENT DOCUMENTS

Figure 1:
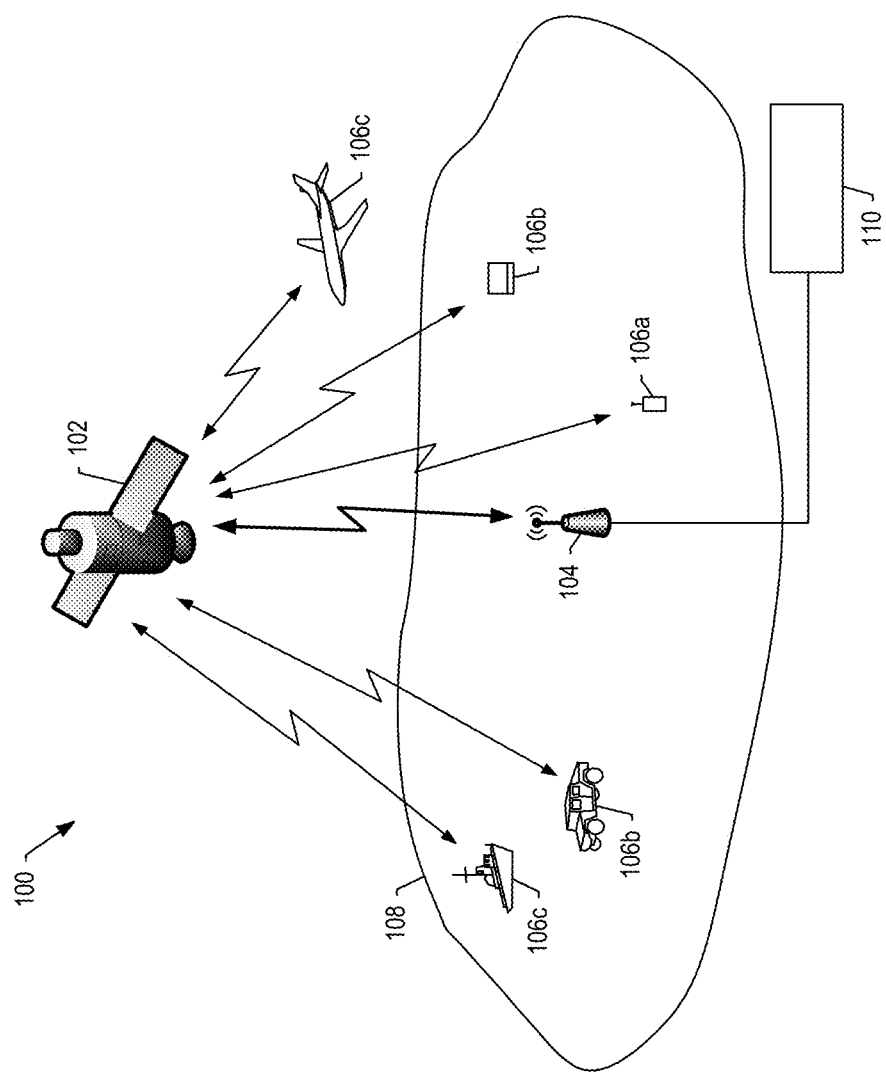

| | | | |
|---|---|---|---|
| 2004/0242152 A1 | 12/2004 | Jarett | |
| 2005/0001760 A1 | 1/2005 | Mrstik | |
| 2007/0217355 A1 | 9/2007 | de La Chapelle et al. | |
| 2007/0281612 A1 | 12/2007 | Benjamin et al. | |
| 2008/0153481 A1 | 6/2008 | Rosen et al. | |
| 2009/0290601 A1 | 11/2009 | Wang et al. | |
| 2010/0117893 A1* | 5/2010 | Dreher | B64G 1/66 342/352 |
| 2010/0177678 A1* | 7/2010 | Sayegh | H04B 7/18513 370/315 |
| 2010/0272151 A1* | 10/2010 | Nandagopalan | H01Q 3/30 375/132 |
| 2010/0302971 A1 | 12/2010 | Walker et al. | |
| 2012/0212371 A1* | 8/2012 | Chang | H01Q 3/2605 342/373 |
| 2012/0274514 A1 | 11/2012 | Petersson et al. | |
| 2013/0109448 A1* | 5/2013 | Garrett | H04B 7/0617 455/575.7 |

OTHER PUBLICATIONS

International Search Report and Written Opinion for PCT/US2014/016949, mailed Dec. 22, 2014, 12 pages.

Koduru, C., Tomei, B., Sichi, S., Suh, K., Ha, T. and Gupta, R., "Advanced Space Based Network Using Ground Based Beam Former," copyright 2011, 29th AIAA International Communications Satellite Systems Conference (ICSSC-2011) Nov. 28-Dec. 1, 2011, Nara, Japan; 9 pages.

Kumar, V., "Mobile Computing Cellular Technology," Computer Science University of Missouri-Kansas City, Kansas City, MO, US, Sep. 3, 2002, 8 pages, http://k.web.umkc.edu/kumarv/cs572/cellular-technology.pdf.

International Preliminary Report on Patentability dated Sep. 15, 2015 for Application No. PCT/US2014/016949.

* cited by examiner

COMPENSATING FOR A NON-IDEAL SURFACE OF A REFLECTOR IN A SATELLITE COMMUNICATION SYSTEM

TECHNOLOGICAL FIELD

The present disclosure relates generally to satellite communication systems and, in particular, to compensating for a non-ideal surface of a reflector in a satellite communication system.

BACKGROUND

Wireless communications access, on which our society and economy is growing increasingly dependent, is becoming pervasive in all aspects of daily societal functions. For example, wireless communication has become increasingly available to users on board mobile platforms such as land vehicles, aircraft, spacecraft, watercraft or the like. Wireless communication services for passengers of mobile platforms include Internet access, e.g., e-mail and web browsing, live television, voice services, virtual private network access and other interactive and real time services.

Wireless communication platforms for remote, hard to access, or mobile user terminals, e.g., mobile platforms, often use communication satellites that can provide service coverage over large geographic footprints, often including remote land-based or water-based regions. Generally, base stations, e.g., a ground base station, send information (e.g., data) to the user terminals through a bent pipe via one or more satellites. More specifically, the base stations send information on a forward link to the satellite that receives, amplifies and re-transmits the information to an antenna of one or more fixed or mobile user terminals. The user terminals, in turn, can send data back to the base stations via the satellite. The base stations can provide the user terminals with links to the Internet, public switched telephone networks, and/or other public or private networks, servers and services.

Modern satellites and other cellular communication systems often employ a number of spot beams providing a beam laydown that forms coverage over a geographic region that may be divided into a plurality of cells. In a communication system using spot beams, the same frequency may be used at the same time in two or more cells. These beams may be configured to maintain a predetermined co-polar isolation (e.g., carrier-to-interference ratio) value in order to minimize the interference among beams. This is called spatial isolation and spatial reuse. In one typical parlance, each spot beam may be assigned a color to create a color pattern that matches a frequency reuse pattern. Identical frequencies, then, may be reused by different beams with the same color.

A number of satellites are currently being developed that include a large reflector, some on the magnitude of 22 meters in diameter, which may enable formation of narrower spot beams and maximum frequency reuse. Some of these satellites have reflectors that are deployable from a stowed configuration to a deployed configuration in which its surface may form a parabola. The deployment is often performed in a space environment, conducted remotely from a ground mission control center.

The performance requirements of a system often assume that the satellite's deployed reflector has an ideal surface (ideally-shaped). But the larger surfaces of some reflectors and their deployment often create distortion that results in a non-ideal surface (non-ideally-shaped). That is, the reflector surface is often not accurately and repeatedly predictable. And when the surface deviates from its ideal shape, performance may degrade. For example, the carrier-to-interference (C/I) ratio may degrade because side-lobe performance cannot be accurately predicted and taken into account.

BRIEF SUMMARY

Example implementations of the present disclosure are generally directed to a system and an associated method of compensating for a non-ideal surface of a reflector in a satellite communication system. According to one aspect of example implementations, the method includes measuring amplitudes and phases of signals (e.g., individual element-path signals) reflected off a reflector of a satellite, with the amplitudes and phases forming a first set of measurements. The method includes calculating an element correlation matrix as a function of the first set of measurements. The element correlation matrix represents a radiated feed element pattern off the reflector. And the method includes adjusting a formed beam pattern of a beamformer based on the element correlation matrix to thereby compensate for a non-ideal surface of the reflector.

In one example, the formed beam pattern may be a function of a feed pattern and beam weights. In this example, adjusting the formed beam pattern may include adjusting the beam weights based on the element correlation matrix.

In one example, the amplitudes and phases may be measured as the satellite is slewed at a predetermined rate over a predetermined range. In a further example, the method may include forwarding the signals to the satellite for reflection off the reflector and transmission to ground, with the satellite receiving the signals over feeder links at a feeder-link antenna. And in this further example, the feeder-link antenna may be counter-slewed as the satellite is slewed.

In one example, the satellite may receive the signals over feeder links. In this example, the method may include measuring the amplitudes and phases of the signals passed through a communication platform of the satellite and returned back (e.g., to a transmitting gateway) over the feeder links independent of the reflector. These respective amplitudes and phases may form a second set of measurements. And in this example, the element correlation matrix may be calculated further as a function of the second set of measurements.

In one example, the beamformer may include first and second beamformers. In this example, the method may include measuring first and second amplitudes and phases of second signals received at respective ones of the first and second beamformers from the satellite over feeder links. The satellite may have received the second signals over the feeder links independent of the reflector, and the respective first and second amplitudes may form first and second second sets of measurements. The method may include calculating a difference measurement as a function of the difference between the first and second second sets of measurements. And the element correlation matrix may be calculated further as a function of the first second set of measurements and difference measurement.

In other aspects of example implementations, a system is provided along with methods more particularly related to compensation for the non-ideal reflector surface in the forward and return directions. The features, functions and advantages discussed herein may be achieved independently in various example implementations or may be combined in yet other example implementations further details of which may be seen with reference to the following description and drawings.

BRIEF DESCRIPTION OF THE DRAWING(S)

Figure 2:
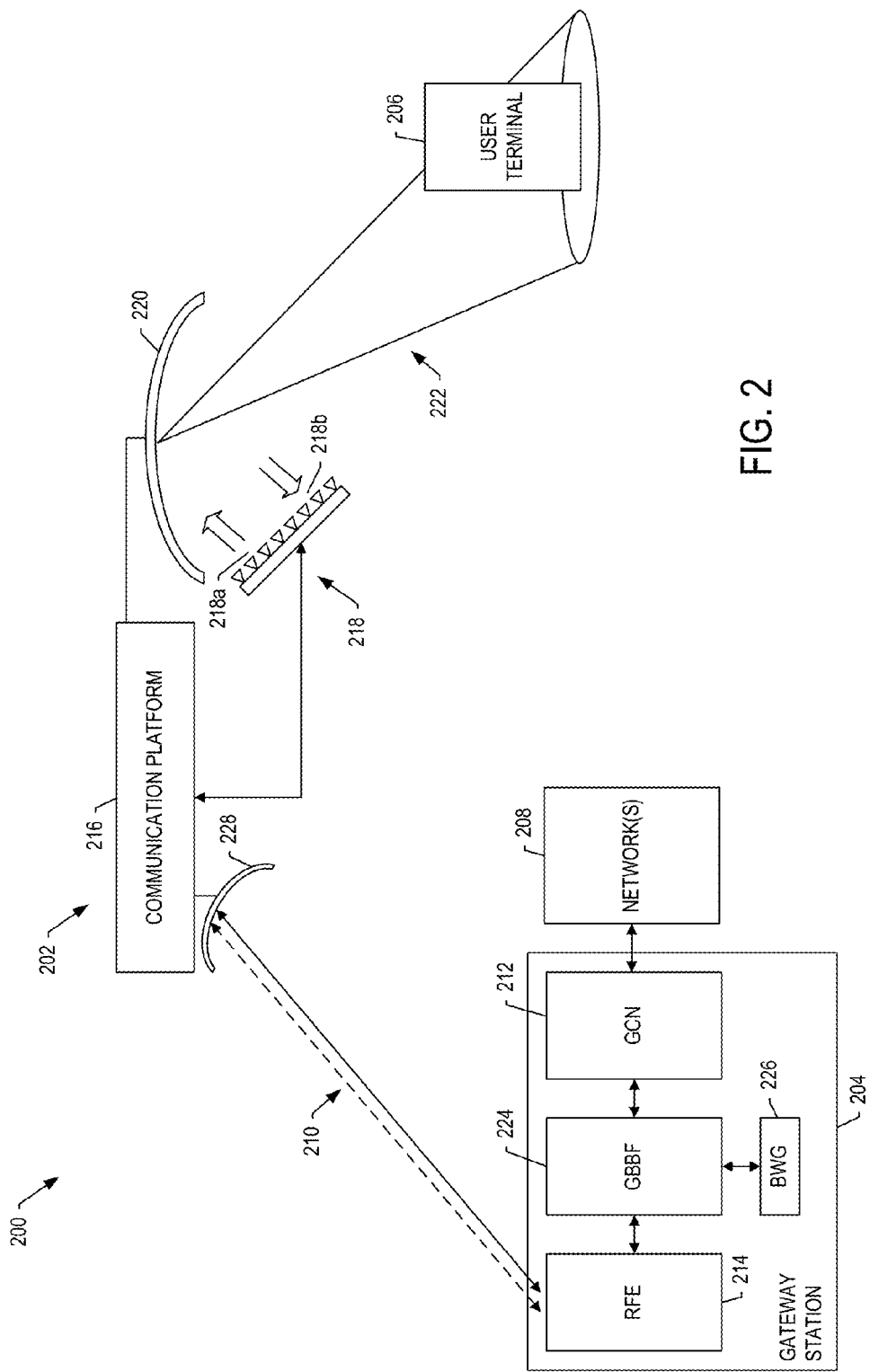
Figure 3:
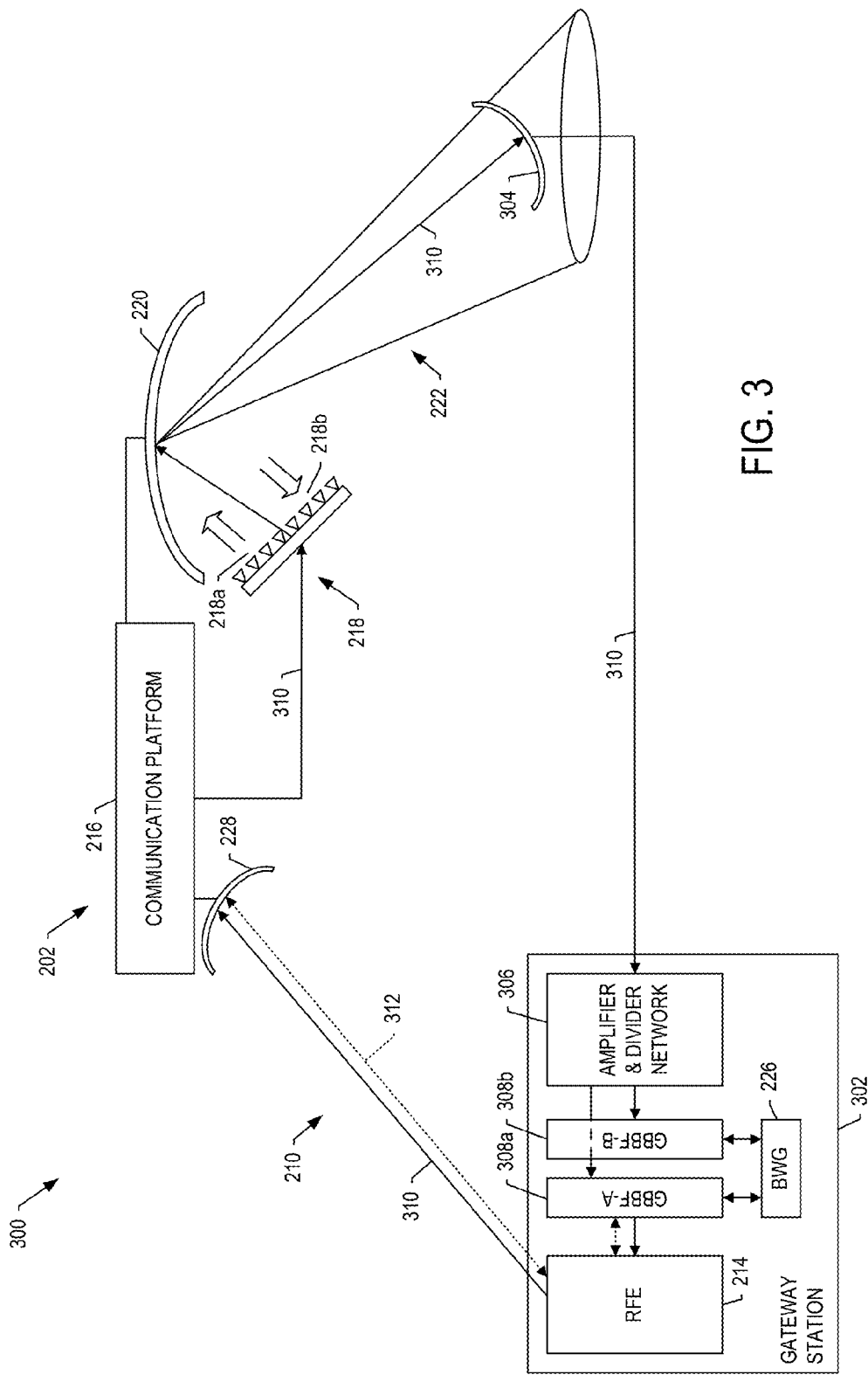
Figure 4:
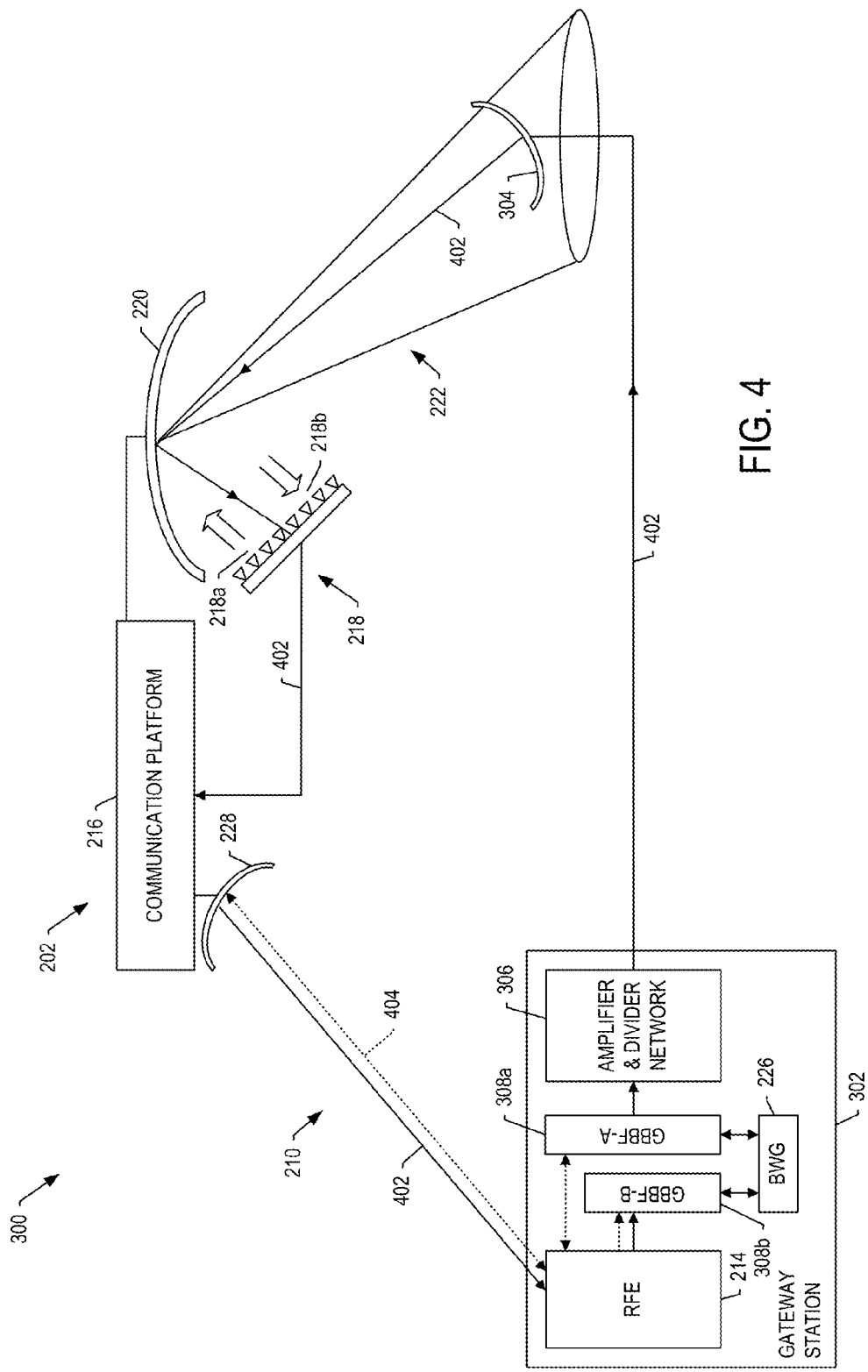
Figure 5:
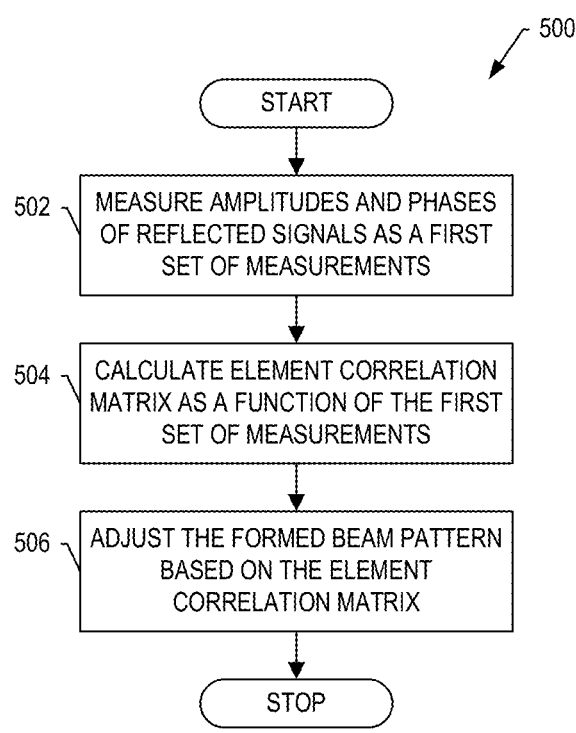

Having thus described example implementations of the disclosure in general terms, reference will now be made to the accompanying drawings, which are not necessarily drawn to scale, and wherein:

FIG. 1 illustrates a satellite communication system according to example implementations of the present disclosure;

FIGS. 2, 3, and 4 are schematic block diagrams of satellite communication systems according to example implementations of the present disclosure; and FIG. 5 illustrates a flowchart including various operations in methods of aspects of example implementations of the present disclosure.

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, reference may be made herein to dimensions of or relationships between components. Those and other similar relationships may be absolute or approximate to account for variations that may occur, such as those due to engineering tolerances or the like. Like reference numerals refer to like elements throughout.

The present disclosure relates to compensating for a non-ideal surface of a reflector in a satellite communication system. As described herein, the term "satellite" may be used without generality and include other types of relay and distribution apparatuses, which in various examples may be located on land or onboard a mobile platform (e.g., land vehicle, aircraft, spacecraft, watercraft). Thus, although the communications system of example implementations may be shown and described as including one or more "satellites," the term may be used more broadly to include one or more relay and distribution apparatuses.

FIG. 1 illustrates one example of a satellite communication system 100 in accordance with various example implementations of the present disclosure. As shown, the satellite communication system may include one or more satellites 102, one or more satellite ground base stations 104 and a plurality of user terminals 106. The user terminals may be of a variety of different types such as small-sized handheld terminals 106a, mid-sized portable and vehicular terminals 106b, and/or large-sized aeronautical and maritime terminals 106c. The satellite may cover a geographic region 108 in which the base station and one or more user terminals may be located. The base station may be coupled to or otherwise part of one or more networks 110, such as the Internet, public switched telephone networks (PSTN), packet data networks (PDN), public land mobile networks (PLMN), private networks such as corporate and government networks, and/or other servers and services.

In various examples, the satellite 102 and base station 104 may enable communication between user terminals 106 and the network 110. In this regard, the base station may receive information (e.g., data) from the network, and communicate the information to the satellite. The satellite may in turn transmit or relay the information to one or more user terminals in spot beams. Conversely, for example, the satellite may receive information from a user terminal, and communicate the information to the base station, which may in turn transmit or relay the information to the network. This type of communication may at times be referred to as "bent-pipe" communication. It should be understood, however, that example implementations may also be applicable to other types of satellite systems, such as those with on-board packet switching.

The satellite 102 may employ a number of spot beams providing a beam laydown that forms coverage over the geographic region 108, which may be divided into a plurality of cells. The beams in one example may cover respective cells of the satellite communication system 100. Each beam may be assigned some beam indicia to create a pattern that matches a frequency reuse pattern for the satellite. In some examples, the beam indicia may be colors or cells, or may be alpha, numeric or alpha-numeric characters. In accordance with example implementations of the present disclosure, the satellite may use same frequency at the same time for two or more cells. That is, the satellite may reuse same frequency in different beams with the same color. In one example, the reuse distance may be measured from the center of one beam to the edge of another beam with the same color.

FIG. 2 more particularly illustrates a satellite communication system 200 that in one example may correspond to the satellite communication system 100 of FIG. 1. As shown, the satellite communication system may include one or more satellites 202, one or more satellite ground base or gateway stations 204 and a plurality of user terminals 206, which in one example may correspond to respective ones of satellite 102, ground base station 104 and user terminals 106. The gateway station may receive information (e.g., data) from one or more networks 208 (e.g., network 110), and communicate the information to the satellite over one or more feeder links 210 in a predetermined frequency band (e.g., Ku-band), and vice versa. As shown, the gateway station may include a ground control network (GCN) 212 that may include, for example, a satellite base sub-system (SBSS) and core network (CN) configured to enable communication with the network. The gateway station may further include radio-frequency (RF) equipment (RFE) 214 and, as explained below, a ground based beam former (GBBF) configured to enable communication with the satellite.

The satellite 202 may transmit or relay information from the gateway station 204 to one or more user terminals 206, and vice versa. The satellite may include a communication platform 216 or payload that carries an antenna system including an array of antenna feed elements 218 (including forward and return feed elements 218a, 218b), and a phased array or reflector 220. This feed array may be configured to receive information from the gateway station 204, and transmit or relay the information to one or more user terminals 206 in spot beams 222 over one or more user links in a predetermined frequency band (e.g., L-band). In various examples, the communication platform may further include appropriate circuitry configured to apply an antenna gain to "close" the user link with a user terminal.

The reflector 220 may be a single reflector or multiple reflectors, and may be of any appropriate size having a parabolic or other appropriate surface. In various examples, the reflector may be large, such as on the magnitude of 22 meters in diameter, which may enable formation of narrower spot beams and maximum frequency reuse. In one example, the reflector may have a surface formed from a mesh material, and may be pulled outward from a stowed configuration to a deployed configuration in which its surface may form a parabola. In some instances, this deployment maybe driven by individually-commandable drive motors located at corner hinges, which may supply torque required to pull tethers to deploy the reflector.

The satellite 202 may employ a number of spot beams 222 providing a beam laydown that forms coverage over a geographic region (e.g., region 108), which may be divided into a plurality of cells. To at least partially facilitate this directional transmission or reception, the satellite communication system 200 may include a beamformer configured to adjust the amplitude and phase of each path to each feed element 218 according to one or more beam coefficients, beam weights or the like (generally "beam weights"). These paths may at times be referred to herein as "element paths." The beamformer may therefore produce beams that may be output to the satellite via respective ports (sometimes referred to as "beamports") of the beamformer. In one example, the beamformer may be implemented at the gateway station as a ground-based beamformer (GBBF) 224.

In various examples, the beam weights may be generated and loaded onto or otherwise received by the GBBF 224. The beam weights may be generated in a number of different manners. In one example, the beam weights may be generated by a computing apparatus such as a beam-weight generator (BWG) 226, or offline by another computing apparatus and loaded into the BWG from which the beam weights may be loaded onto the GBBF. The GBBF may use the beam weights to form beams corresponding to respective cells, and output the beams to the satellite 202 via respective beamports.

In the forward direction, signals from the network 208 may be sent to the GBBF 224 via the GCN 212. The GBBF may apply the appropriate beam weight or set of beam weights to the signals, which may result in several signals intended for respective forward feed elements 218a of the communication platform 216 of the satellite 202. The GBBF may then forward the signals to the satellite via the RFE 214. The satellite may then provide the signals to the appropriate user terminal 206 in a spot beam 222 in the coverage area. In one example, the satellite may receive the signals over feeder links 210 at a feeder-link antenna 228, amplify, down-convert and route the signals to the forward feed elements through appropriate circuitry. In this regard, the communication platform 216 may include a forward channelizer (and a corresponding return channelizer for the return direction) configured to route signals between the feeder-link-band signals and user-link-band signals, and a hybrid matrix configured to distribute the signals to the forward feed elements according to a hybrid-matrix-to-combiner transform. And from the forward feed elements, the signals may radiate off the reflector 220 toward a cell in the geographic region where the signals may be received by a user terminal 206 in the respective cell.

In the return direction, signals from a user terminal 206 may be sent to the satellite 202, which may be reflected off the reflector 220 and received by the return feed elements 218b. The signals may be amplified and routed to the gateway station 204 in feeder links 210. At the gateway station, the signals may be received by the GBBF 224 via the RFE 214. The GBBF may use the appropriate beam weight or set of beam weights to strengthen these user signals, which may then continue to the network for processing and routing.

In one example, the beam forming performed by the GBBF 224 may be described by the following:

$$\Sigma(\text{Feed Pattern} \times \text{Beam Weights}) = \text{Formed Beam Pattern} \quad (1)$$

In the preceding, each feed pattern may be similar to an individual radio-frequency (RF) radiation pattern in the geographic region (e.g., region 108) reflecting off the reflector 220. The radiation patterns may be appropriately weighted by respective beam weights, and summed to produce a concentrated, controlled radiation pattern in the geographic region sometimes referred to as a "formed beam." The formed beam performance may be measured by a number of parameters including, for example, an effective isotropic radiated power (EIRP), a gain-to-system-temperature ratio (G/T), carrier-to-interference ratio (C/I) and the like.

Beam weights are often generated to meet certain performance requirements including EIRP, G/T, C/I and the like, and often assuming that the reflector has an ideal surface (ideally-shaped). But as explained in the background section, the larger surfaces of some reflectors 220 (e.g., parabolic reflectors) and their deployment often create distortion that results in a non-ideal surface (non-ideally-shaped). That is, the reflector surface is often not accurately and repeatedly predictable. And when the surface deviates from its ideal shape, performance may degrade. For example, C/I may degrade because side-lobe performance cannot be accurately predicted and taken into account.

As seen from equation (1), the formed beam properties may be controlled by the feed pattern (off the reflector 220) and the beam weights, which may provide degrees of freedom to achieve desired performance. In accordance with example implementations of the present disclosure, then, signals reflected off the reflector including a non-ideal surface may be measured. The beam weights may then be adjusted based on the measurements to provide the same or closer to the same formed beam pattern as a corresponding reflector including an ideal surface, which may enable the system to meet certain performance requirements such as C/I.

FIG. 3 illustrates an example satellite communication system 300 similar to the system 200 shown in FIG. 2, but in which the gateway station 302 includes one or more antennas 304 in a cell of the geographic region (e.g., region 108) over which the satellite 202 provides coverage. In one example, the antenna(s) may include an in-orbit test (IOT) antenna (e.g., L-band antenna) that may otherwise be used by the gateway station for IOT functions, and one or more uplink beacon station (UBS) antennas that may be otherwise used for purposes such as power control, pointing the satellite and the like. Similar to the user terminal 206, then, satellite may be capable of providing signals to the gateway station in a spot beam 222 in the coverage area. And as also shown, antenna(s) may be coupled to the gateway station including an amplifier (e.g., low-noise amplifier, solid-state power amplifier, etc.) and divider network 306, through which the antenna(s) may be coupled to the GBBF that may include first and second GBBFs (GBBF-A, GBBF-B) 308a, 308b. Although shown separately, in some example implementations, a single GBBF may support both GBBF-A and GBBF-B, logically separated but co-located within the single GBBF.

In accordance with one example implementation of the present disclosure, the GBBF-A 308a may generate one or more forward calibration embedded (FCAL-E) signals in a respective one or more service bands for each element path. In one example, the FCAL-E signals may be the same or similar to those that may otherwise be embedded along with traffic signals. In one example, the service band(s) may include lower, middle and upper frequency bands in a predefined frequency spectrum, such as lower, middle and upper 2.5 MHz bands in the 34 MHz L-band spectrum.

Similar to before, the GBBF-A 308a may forward the FCAL-E signals to the satellite via the RFE 214 and over feeder links 210, and may be received at the feeder-link antenna 228. The satellite may then pass the FCAL-E signals through the communication platform path 308 and radiate the FCAL-E signals toward the gateway station antenna 304 (e.g., IOT antenna) in a spot beam 222 in the coverage area. The FCAL-E signals may then pass to the amplifier and divider network 306, and then to the GBBF-A 308a or GBBF-B 308b. The GBBF may receive the FCAL-E signals, and measure and store their relative amplitudes and phases. This path may be referred to herein as a first forward path 310.

As the signals pass along the first forward path 310, the satellite 202 may be slewed or otherwise turned at a predetermined rate over a predetermined range (e.g., east-west, north-south) in the coverage area. During this slew, the feeder-link antenna 228 may be counter-slewed to maintain communication over those links. The GBBF-A 308a or GBBF-B 308b, then, may receive the FCAL-E signals, and measure and store their amplitudes and phases at one or more instances during the slew, such as at one-second intervals during a slew at a predetermined rate of 0.01 degrees/second. This may occur for one or more predetermined slews across the coverage area.

The amplitudes and phases measured by the GBBF-A 308a or GBBF-B 308b may be stored as a forward first set of measurements across a desired a desired azimuth and elevation, and at times may be simply referred to as F1. These measurements may be formatted as a forward element correlation matrix ($ECM_F$), and may represent the radiated feed element pattern off the reflector 220 at discrete points. In one example, then, the $ECM_F$ may be used by the GBBF-A, GBBF-B and/or BWG 226 to adjust the feed pattern or beam weights, and thereby adjust the formed beam pattern in the forward direction, referring again to equation (1). As indicated above, this may provide the same or closer to the same formed beam pattern as a corresponding reflector including an ideal surface, and may enable the system 300 to meet certain performance requirements (e.g., EIRP, G/T, C/I).

In various examples, in addition to a non-ideal reflector 220, the satellite communication system 300 may further apply a calibration to account for a non-ideal satellite communication platform 216. In these examples, the FCAL-E signals forwarded by the GBBF-A 308a to the satellite via the RFE 214 and over feeder links 210, may pass through at least a portion of the communication platform and return back to the GBBF-A over the feeder links and via the RFE. In one example, the FCAL-E signals may be routed through the forward channelizer and hybrid matrix. The distributed signals from the hybrid matrix may be combined by an appropriate combiner, and then returned back to the GBBF-A. The GBBF-A may receive the FCAL-E signals, and measure and store their amplitudes and phases. This path may be referred to herein as a second forward path 312.

Similar to the first forward path 310, the satellite 202 may be slewed as the respective signals pass along the second forward path 312. The GBBF-A 308a may receive the FCAL-E signals, and measure and store their amplitudes and phases at one or more instances during the slew, such as at one-second intervals during a slew at a predetermined rate of 0.01 degrees/second. This may occur for one or more predetermined slews across the coverage area.

The amplitudes and phases measured by the GBBF-A 308a may be stored as a forward second set of measurements across the desired a desired azimuth and elevation, and at times may be simply referred to as F2. In one example, then, the forward element correlation matrix may be calculated as a function of F1 and F2, such as in accordance with the following:

$$ECM_F = F1 - (F2 - HMCT)$$

In the preceding, HMCT may refer to the hybrid-matrix-to-combiner transform of a hybrid matrix of the communication platform 216. In one example, this transform may be measured and stored in a database during an on-ground integration and test of the satellite 202. In various examples, the $ECM_F$ (either as F1 or a function of F1 and F2) may be calculated by a computing apparatus such as the BWG 226, or offline by another computing apparatus and loaded into the BWG. Similar to before, the $ECM_F$ may be used by the GBBF-A, GBBF-B 308b and/or BWG to adjust the beam weights, and thereby adjust the formed beam pattern in the forward direction.

FIG. 3 illustrates an example satellite communication system 300 and adjustment of the formed beam pattern in the forward direction. FIG. 4 illustrates the example satellite communication system but with adjustment of the formed beam pattern in the return direction. In accordance with one example implementation of the present disclosure, the GBBF-A 308a may generate one or more pointing reference beacon (PRB) signals in a respective one or more service bands. Similar to the forward direction, in one example, the service band(s) may include lower, middle and upper frequency bands in a predefined frequency spectrum, such as lower, middle and upper 2.5 MHz bands in the 34 MHz L-band spectrum.

The GBBF-A 308a may forward the PRB signals to the satellite via the amplifier and divider network 306 and antenna 304 (e.g., UBS/IOT antenna) and over user links. The satellite may then provide the PRB signals to the gateway station 302 over feeder links 210. The PRB signals may then pass to the RFE 214, and from the RFE pass to the GBBF-B 308b. The GBBF-B may receive the PRB signals, and measure and store their amplitudes and phases. This path may be referred to herein as a first return path 402.

As the signals pass along the first return path 402, similar to the forward path, the satellite 202 may be slewed or otherwise turned at a predetermined rate over a predetermined range (e.g., east-west, north-south) in the coverage area. During this slew, the feeder-link antenna 228 may be counter-slewed to maintain communication over those links. The GBBF-B 308b, then, may receive the PRB signals, and measure and store their amplitudes and phases at one or more instances during the slew, such as at one-second intervals during a slew at a predetermined rate of 0.01 degrees/second. This may occur for one or more predetermined slews across the coverage area.

The amplitudes and phases measured by the GBBF-B 308b may be stored as a return first set of measurements across a desired a desired azimuth and elevation, and at times may be simply referred to as R1. These measurements may be formatted as a return element correlation matrix ($ECM_R$), and similar to $ECM_F$, may represent the radiated feed element pattern off the reflector 220 at discrete points. In one example, then, the $ECM_R$ may be used by the GBBF-A 308a, GBBF-B and/or BWG 226 to adjust the beam weights, and thereby adjust the formed beam pattern in the return direction.

In various examples, in addition to a non-ideal reflector 220, the satellite communication system 300 may further account for a non-ideal GBBF-A 308a and GBBF-B 308b (similar to the forward direction accounting for a non-ideal satellite communication platform 216). In the return direction, for example, the GBBFs may include respective analog front ends (AFEs) that may differ from one another. In these examples, the GBBF-A may forward return calibration (RCAL-E) signals to the satellite 202 via the RFE 214 and over feeder links 210, which may pass through at least a portion of the communication platform and return back to the GBBF-A over the feeder links and via the RFE. In one example, the FCAL-E signals may be divided by an appropriate divider and routed through the return channelizer, and then returned back to the GBBF-A, and forwarded to the GBBF-B. Each GBBF may receive the FCAL-E signals, and measure and store their amplitudes and phases. This path may be referred to herein as a second forward path 404.

In one example, the GBBF-A 308*a* and GBBF-B 308*b* may receive the FCAL-E signals, and measure and store their amplitudes and phases at one or more instances before the satellite 202 is slewed, such as at one-second intervals over a period of sixty seconds. The amplitudes and phases measured by the GBBF-A may be stored as a return first second set of measurements, and at times may be simply referred to as R2-A. Likewise, the amplitudes and phases measured by the GBBF-B may be stored as a return second second set of measurements, and at times may be simply referred to as R2-B.

A difference measurement ($\Delta AFE$) representative of the difference in AFEs between the GBBFs 308*a*, 308*b* may be calculated as a function of the difference between R2-A and R2-B, such as their average difference. In one example, then, the return element correlation matrix may be calculated as a function of R1, R2-A and $\Delta AFE$, such as in accordance with the following:

$$ECM_R = R1 - (R2\text{-}A + RBF) + \Delta AFE$$

In the preceding, RBF may refer to a return basis function, which may describe transformation characteristics of components in the return direction. Similar to the hybrid-matrix-to-combiner transform, in one example, the return basis function may be measured and stored in a database during an on-ground integration and test of the satellite 202. In various examples, the $ECM_R$ (either as R1 or a function of R1, R2-A and $\Delta AFE$), and/or $\Delta AFE$, may be calculated by a computing apparatus such as the BWG 226, or offline by another computing apparatus and loaded into the BWG. Similar to before, the $ECM_R$ may be used by the GBBF-A, GBBF-B and/or BWG to adjust the beam weights, and thereby adjust the formed beam pattern in the return direction.

FIG. 5 illustrates a flowchart including various operations in a method 500 of one aspect of example implementations of the present disclosure. As shown in block 502, the method of this aspect includes measuring amplitudes and phases of signals reflected off a reflector of a satellite, with the amplitudes and phases forming a first set of measurements. As shown in block 504, the method includes calculating an element correlation matrix as a function of the first set of measurements. The element correlation matrix represents a radiated feed element pattern off the reflector. And as shown in block 506, the method includes adjusting a formed beam pattern of a beamformer based on the element correlation matrix to thereby compensate for a non-ideal surface of the reflector.

Many modifications and other implementations of the disclosure set forth herein will come to mind to one skilled in the art to which this disclosure pertains having the benefit of the teachings presented in the foregoing description and the associated drawings. Therefore, it is to be understood that the disclosure not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system comprising:
   a beamformer configured to measure amplitudes and phases of signals reflected off a reflector of a satellite, the amplitudes and phases forming a first set of measurements; and
   a computing apparatus configured to calculate an element correlation matrix as a function of the first set of measurements, the element correlation matrix representing a radiated feed element pattern off the reflector,
      wherein the beamformer is configured to generate a formed beam pattern adjusted based on the element correlation matrix.

2. The system of claim 1, wherein the formed beam pattern is a function of a feed pattern and beam weights, and the beamformer is configured to generate the formed beam pattern as a function of the beam weights adjusted based on the element correlation matrix.

3. The system of claim 1, wherein the beamformer is configured to measure the amplitudes and phases as the satellite is slewed at a predetermined rate over a predetermined range.

4. The system of claim 1, wherein the beamformer is further configured to forward the signals to the satellite for reflection off the reflector, the satellite being configured to receive the signals over feeder links at a feeder-link antenna, and
   wherein the feeder-link antenna is counter-slewed as the satellite is slewed.

5. The system of claim 1, wherein the satellite is configured to receive the signals over feeder links,
   wherein the beamformer includes first and second beamformers, the first beamformer being configured to measure the amplitudes and phases of the signals reflected off a reflector, and the second beamformer being configured to measure the amplitudes and phases of the signals passed through a communication platform of the satellite and returned back over the feeder links independent of the reflector, the respective amplitudes and phases forming a second set of measurements, and
   wherein the computing apparatus is configured to calculate the element correlation matrix further as a function of the second set of measurements.

6. The system of claim 1, wherein the beamformer includes first and second beamformers, the first beamformer being configured to measure the amplitudes and phases of the signals reflected off a reflector,
   wherein the first and second beamformers are configured to measure first and second amplitudes and phases of second signals received at respective ones of the first and second beamformers from the satellite over feeder links, the satellite having received the second signals over the feeder links independent of the reflector, the respective first and second amplitudes forming first and second second sets of measurements,
   wherein the computing apparatus is configured to calculate a difference measurement as a function of the difference between the first and second second sets of measurements, and calculate the element correlation matrix further as a function of the first second set of measurements and difference measurement.

7. A method comprising:
  measuring amplitudes and phases of signals reflected off a reflector of a satellite, the amplitudes and phases forming a first set of measurements;
  calculating an element correlation matrix as a function of the first set of measurements, the element correlation matrix representing a radiated feed element pattern off the reflector; and
  adjusting a formed beam pattern of a beamformer based on the element correlation matrix.

8. The method of claim 7, wherein the formed beam pattern is a function of a feed pattern and beam weights, and adjusting the formed beam pattern includes adjusting the beam weights based on the element correlation matrix.

9. The method of claim 7, wherein the amplitudes and phases are measured as the satellite is slewed at a predetermined rate over a predetermined range.

10. The method of claim 7 further comprising:
  forwarding the signals to the satellite for reflection off the reflector, the satellite receiving the signals over feeder links at a feeder-link antenna,
  wherein the feeder-link antenna is counter-slewed as the satellite is slewed.

11. The method of claim 7, wherein the satellite receives the signals over feeder links, wherein the method further comprises:
  measuring the amplitudes and phases of the signals passed through a communication platform of the satellite and returned back over the feeder links independent of the reflector, the respective amplitudes and phases forming a second set of measurements, and
  wherein the element correlation matrix is calculated further as a function of the second set of measurements.

12. The method of claim 7, wherein the beamformer includes first and second beamformers, wherein the method further comprises:
  measuring first and second amplitudes and phases of second signals received at respective ones of the first and second beamformers from the satellite over feeder links, the satellite having received the second signals over the feeder links independent of the reflector, the respective first and second amplitudes forming first and second second sets of measurements; and
  calculating a difference measurement as a function of the difference between the first and second second sets of measurements,
  wherein the element correlation matrix is calculated further as a function of the first second set of measurements and difference measurement.

13. A method comprising:
  measuring amplitudes and phases of signals received by a satellite over feeder links, passed through a communication platform and reflected off a reflector of the satellite in a forward direction, the amplitudes and phases forming a first set of measurements;
  measuring the amplitudes and phases of the signals passed through the communication platform and returned back over the feeder links independent of the reflector, the respective amplitudes and phases forming a second set of measurements;
  calculating an element correlation matrix as a function of the first and second sets of measurements, the element correlation matrix representing a radiated feed element pattern off the reflector; and
  adjusting a formed beam pattern of a beamformer based on the element correlation matrix.

14. The method of claim 13, wherein the formed beam pattern is a function of a feed pattern and beam weights, and adjusting the formed beam pattern includes adjusting the beam weights based on the element correlation matrix.

15. The method of claim 13, wherein the amplitudes and phases are measured as the satellite is slewed at a predetermined rate over a predetermined range.

16. The method of claim 13 further comprising:
  forwarding the signals to the satellite for reflection off the reflector, the satellite receiving the signals over feeder links at a feeder-link antenna,
  wherein the feeder-link antenna is counter-slewed as the satellite is slewed.

17. A method comprising:
  measuring amplitudes and phases of signals reflected off a reflector of a satellite, and forwarded by the satellite to a beamformer in a return direction, the beamformer including first and second beamformers, and the amplitudes and phases forming a first set of measurements;
  measuring first and second amplitudes and phases of second signals received at respective ones of the first and second beamformers from the satellite over feeder links, the satellite having received the second signals over the feeder links independent of the reflector, the respective first and second amplitudes forming first and second second sets of measurements;
  calculating a difference measurement as a function of the difference between the first and second second sets of measurements;
  calculating an element correlation matrix as a function of the first set of measurements, first second set of measurements and difference measurement, the element correlation matrix representing a radiated feed element pattern off the reflector; and
  adjusting a formed beam pattern of a beamformer based on the element correlation matrix.

18. The method of claim 17, wherein the formed beam pattern is a function of a feed pattern and beam weights, and adjusting the formed beam pattern includes adjusting the beam weights based on the element correlation matrix.

19. The method of claim 17, wherein the amplitudes and phases are measured as the satellite is slewed at a predetermined rate over a predetermined range.

20. The method of claim 17 further comprising:
  forwarding the signals to the satellite for reflection off the reflector, the satellite receiving the signals over feeder links at a feeder-link antenna,
  wherein the feeder-link antenna is counter-slewed as the satellite is slewed.

* * * * *